United States Patent [19]

Faris

[11] Patent Number: 5,844,717

[45] Date of Patent: Dec. 1, 1998

[54] METHOD AND SYSTEM FOR PRODUCING MICROPOLARIZATION PANELS FOR USE IN MICROPOLARIZING SPATIALLY MULTIPLEXED IMAGES OF 3-D OBJECTS DURING STEREOSCOPIC DISPLAY PROCESSES

[75] Inventor: Sadeg M. Faris, Pleasantville, N.Y.

[73] Assignee: Reveo, Inc., Hawthorne, N.Y.

[21] Appl. No.: 527,094

[22] Filed: Sep. 12, 1995

Related U.S. Application Data

[63] Continuation of Ser. No. 269,202, Jun. 30, 1994, which is a continuation of Ser. No. 536,419, Jun. 11, 1990, Pat. No. 5,327,285.

[51] Int. Cl.$^6$ ................................................ H04N 13/00
[52] U.S. Cl. ................................................ 359/483; 359/489
[58] Field of Search .................................... 359/483, 489

[56] References Cited

U.S. PATENT DOCUMENTS

| | | |
|---|---|---|
| 1,435,520 | 11/1922 | Hammond . |
| 2,099,694 | 11/1937 | Land . |
| 2,301,254 | 11/1942 | Carnahan . |
| 2,317,875 | 9/1943 | Athey et al. . |
| 2,385,687 | 9/1945 | Carnahan . |
| 2,417,446 | 3/1947 | Reynolds . |
| 2,571,612 | 10/1951 | Rines . |
| 2,631,496 | 4/1953 | Rehorn . |
| 2,647,440 | 8/1953 | Rehorn . |
| 2,949,055 | 8/1960 | Blackstone . |
| 2,983,835 | 5/1961 | Frey . |
| 3,275,745 | 9/1966 | Var . |
| 3,371,324 | 2/1968 | Sinto . |
| 3,507,549 | 4/1970 | Land . |
| 3,741,626 | 6/1973 | Wentz . |
| 3,807,831 | 4/1974 | Soret . |
| 3,821,466 | 6/1974 | Roese . |
| 3,858,001 | 12/1974 | Bonne . |
| 3,944,351 | 3/1976 | Ito et al. . |
| 4,122,484 | 10/1978 | Tan . |
| 4,281,341 | 7/1981 | Bygtt . |
| 4,286,286 | 8/1981 | Jurosson et al. . |
| 4,431,265 | 2/1984 | Benton . |
| 4,504,856 | 3/1985 | Jackman . |
| 4,523,226 | 6/1985 | Lipton et al. . |
| 4,562,463 | 12/1985 | Lipton . |
| 4,566,758 | 1/1986 | Bos . |
| 4,582,396 | 4/1986 | Bos et al. . |
| 4,583,117 | 4/1986 | Lipton . |

(List continued on next page.)

FOREIGN PATENT DOCUMENTS

| | | |
|---|---|---|
| 5389959 | 3/1980 | Japan . |
| 59264515 | 6/1986 | Japan . |
| 61-59555 | 9/1987 | Japan . |
| 489888 | 8/1938 | United Kingdom . |
| 1523436 | 8/1978 | United Kingdom . |
| 2111798 | 7/1983 | United Kingdom . |
| 2231754 | 11/1990 | United Kingdom . |

OTHER PUBLICATIONS

"Stereoscopic real–time and multiplexed video system" by Lenny Lipton, StereoGraphics Corporation, published in SPIE, vol.1915, Stereoscopic Displays and Applications IV, pp.6–11, Feb., 1993.

Technical Brochure for the SGS 310, 410, 610 Stereoscopic 3–D Display Kits, published Jun. 1992 from Tektronix Display Products, Beaverton, Oregon.

Article in NASA Tech Briefs, Sep. 1991, pp. 12–13, Describing CrystalEyes® stereo 3–D viewing system from StereoGraphics Corp., San Rapheal, CA.

(List continued on next page.)

*Primary Examiner*—Mark Hellner
*Attorney, Agent, or Firm*—Thomas J. Perkowski

[57] ABSTRACT

A method of mass producing a micropolarizer including the steps exposing films of predetermined polarization states to electromagnetic radiation through masks of predetermined patterns, etching away exposed parts of each film and aligning and laminating the films to one another to provide a microplolarizer comprising alternating sets of microscopic polarizers with different polarization states.

44 Claims, 12 Drawing Sheets

U.S. PATENT DOCUMENTS

| | | |
|---|---|---|
| 4,588,259 | 5/1986 | Sheiman . |
| 4,641,178 | 2/1987 | Street . |
| 4,670,744 | 6/1987 | Buzak . |
| 4,709,263 | 11/1987 | Brumage . |
| 4,719,507 | 1/1988 | Bos . |
| 4,723,159 | 2/1988 | Imsand . |
| 4,792,850 | 12/1988 | Lipton . |
| 4,873,572 | 10/1989 | Miyazaki et al. . |
| 4,877,307 | 10/1989 | Kalmanash . |
| 4,943,852 | 7/1990 | Femano et al. . |
| 4,984,179 | 1/1991 | Waldern . |
| 4,995,718 | 2/1991 | Jachimonowicz et al. . |
| 5,007,715 | 4/1991 | Verhulst . |
| 5,113,285 | 5/1992 | Franklin . |
| 5,327,285 | 7/1994 | Faris ........................................ 359/483 |

OTHER PUBLICATIONS

"Large Screen Electro–stereoscopic Displays" by Lenny Lipton, published in SPIE vol.1255 Large–Screen Projection Display II, pp. 108–113, Feb. 1990.

"Field–sequential Electronic Stereoscopic Projector" by Lenny Lipton, published in SPIE vol. 1081 Projection Display Technology Systems and Applications, pp. 94–100, Jan. 1989.

"Compatibility of Stereoscopic Video Systems with Broadcast Television Standards" by Lenny Lipton, published in SPIE vol.1083 Three–Dimensional Visualization and Display Technologies, pp. 95–101, 1989.

"Field–Sequential Stereoscopic Viewing Systems Using Passive Glasses" by Bos, et al., published in Proceedings of the SID, vol. 30, No. 1, pp. 39–43, 1989.

"A Real–time Autostereoscopic Multiplanar 3D Display System" by Rodney Williams, et al. of Texas Instruments, Inc., published in SID 88 Digest, pp. 91–94, 1988.

"High–Performance 3D Viewing Systems Using Passive Glasses", by Philip Bos, published in SID 88 Digest, pp. 450–453, 1988.

"Experience with Stereoscopic Devices and Output Algorithms" by James S. Lipscomb, published in SPIE vol. 1083 Three–Dimensional Visualization and Display Technologies, pp. 28–34, 1989.

"3–D Comes Home" by Tom Waters, published in Discover, May 1988, pp. 30–32.

"Circular Polarization Image Selection for Timeplex Stereoscopic Video Devices" by Lenny Lipton, Stereographics Corporation, published in SPIE vol. 779 Display System Optics, May 1987, pp. 41–44.

"Three–dimensional TV with cordless FLC Spectacles" by W.J. Hartmann et al., published in Information Display, vol. 10, 1987, pp. 15–17.

"Holographic Display of Three–Dimensional Images" by Larry Hodges et al., published in Information Display, vol. 10, 1987, pp. 8–11.

"Hard copy for true three–dimensional images" by Larry Hodges, et al., published in Information Display, vol.9, 1987, pp. 12–15,25.

"Varifocal Mirror Techniques for Video Transmission of Three–Dimensional Images" by M.C. King, et al, published in Applied Optics, vol.9, No.9, Sep. 1970, pp. 2035–2039.

Section 14.6.3 Dichroic Polarizers (pp. 716–718), in Principles of Optics (Fourth Edition) 1970, by Max Born and Emil Wolf, published by Pergamon Press, Oxford.

"A New Approach to Computer–Generated Holography" by M.C. King, et al., published in Applied Optics, vol.9, No. 2, Feb. 1970, pp. 471–475.

Chapter 10, Section 10.1 Introduction to Polarized Light, Section 10.2 Methods of Producing Polarized Light, and Section 10.3 The Transverse Nature of Light (pp. 485–520), in Optics by Miles V. Klein, published by John Wiley & Sons, Inc. New York.

Chapter 8, Polarization pp. 395–450, in Waves: Berkeley Physics Course–vol. 3, by Frank S. Crawfrod, Jr.

Low–Cost 3D–TV in Electronics (Edited by Alexander A. McKenzie), Jul. 1953, at p. 1996.

Proposal entitled "3–D Flat Panel Color Display PRDA 89–9 Technical/Management and Cost" prepared for Directorate of R&D Contracting ASD/PMRNB, Wright–Patterson AFB, Ohio, by Honeywell, Inc. Systems and Research Center, Phoenix Technology Center, Aug. 1989.

"True three–dimensional CRT–based displays" by Larry Hodges, et al., published in Information Display, vol.5, 1987, pp. 18–22.

"Holographic Micropatterns and the Ordering of Photographic Grains in Film Systems"(Abstract) by James Cowan, et al., published in ACTA Polytechnica Scandinavica, Applied Physics Series No. 149, Proceedings of Image Science '85, vol.1, Jun. 1985.

"Three–dimensional Projection with Circular Polarizers" by Vivian Walworth, et al., published by SPIE vol. 462 Optics in Entertainment II, Jan. 1984, pp. 64–68.

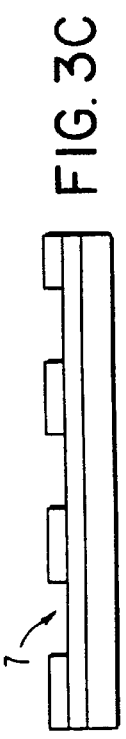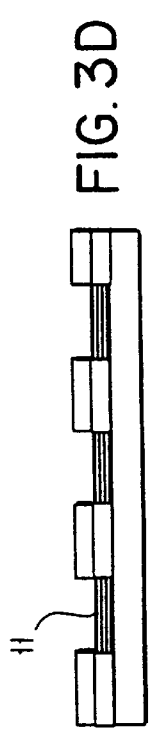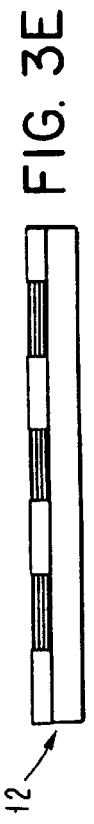

FIG.5A
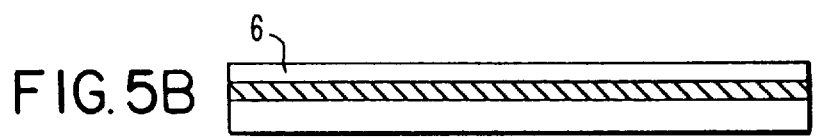
FIG.5B
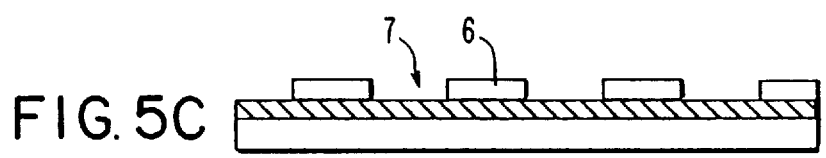
FIG.5C
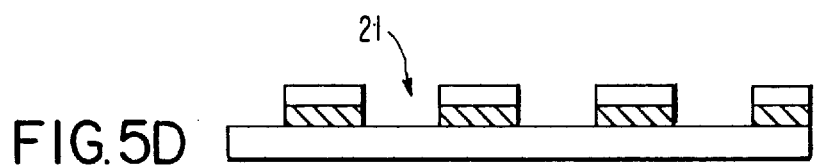
FIG.5D
FIG.5E
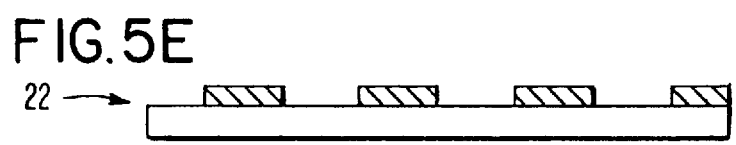

FIG. 6A
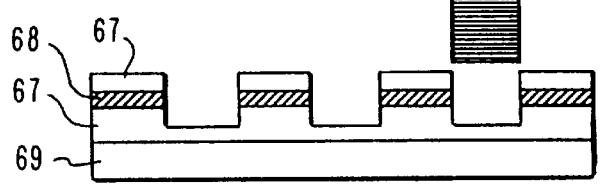
FIG. 6B
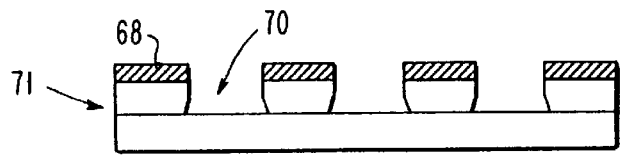
FIG. 6C
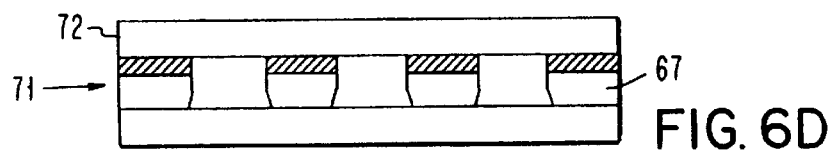
FIG. 6D
FIG. 6E
FIG. 6F
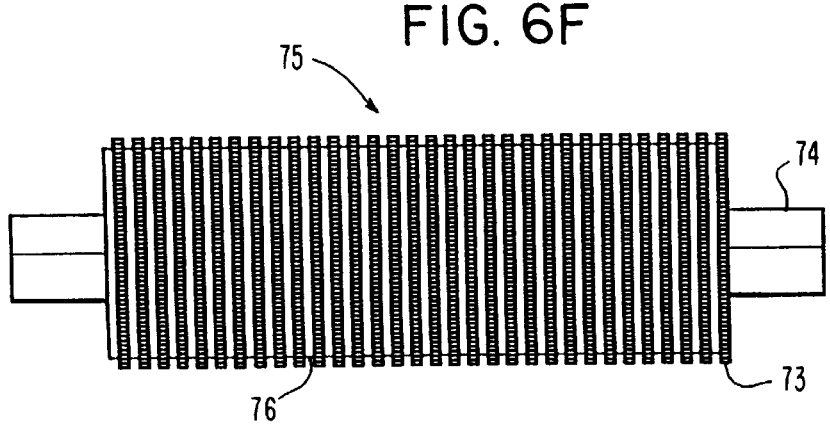
FIG. 6G
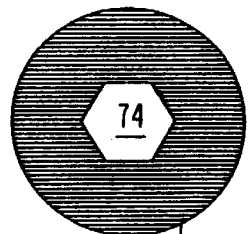

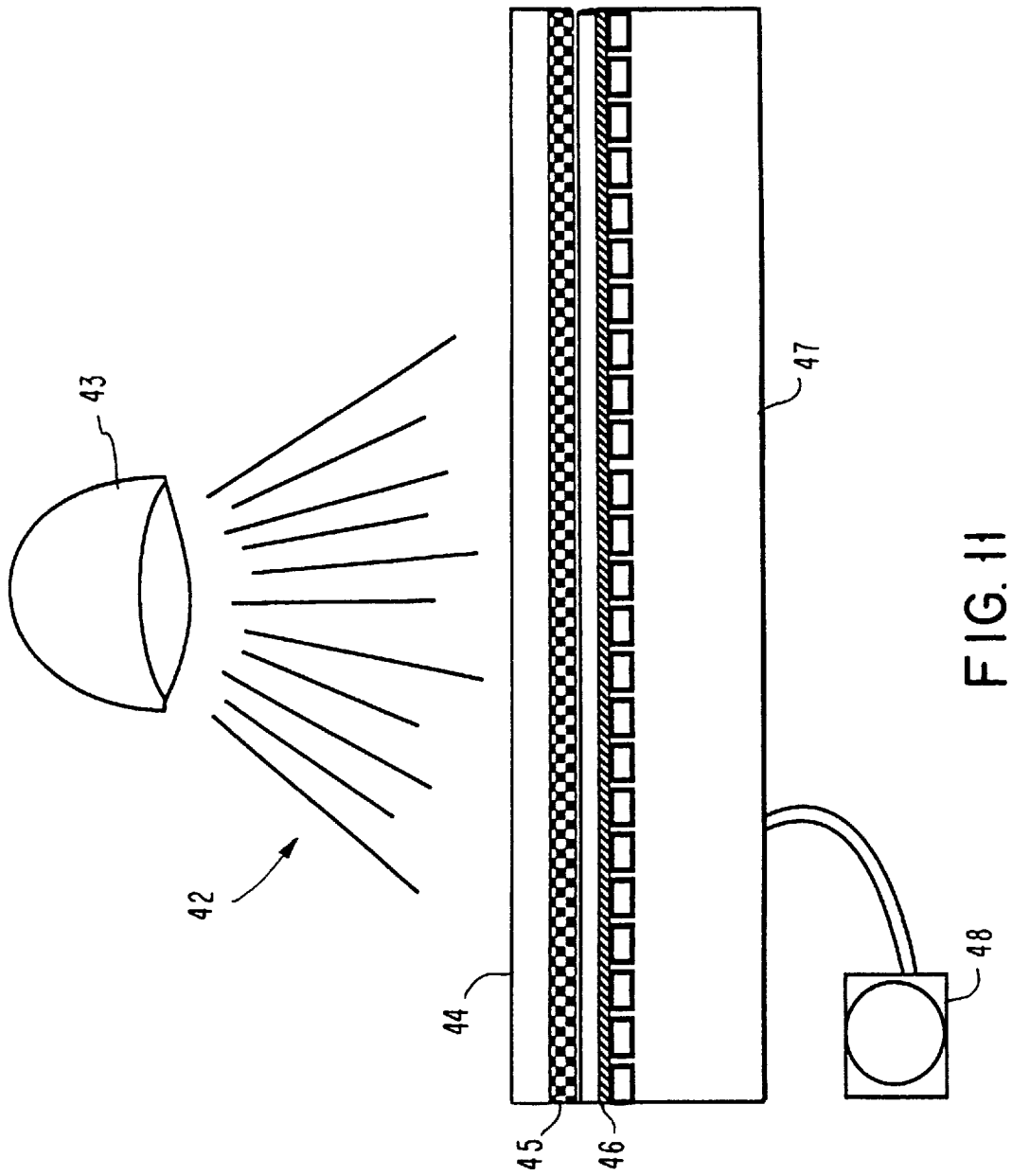

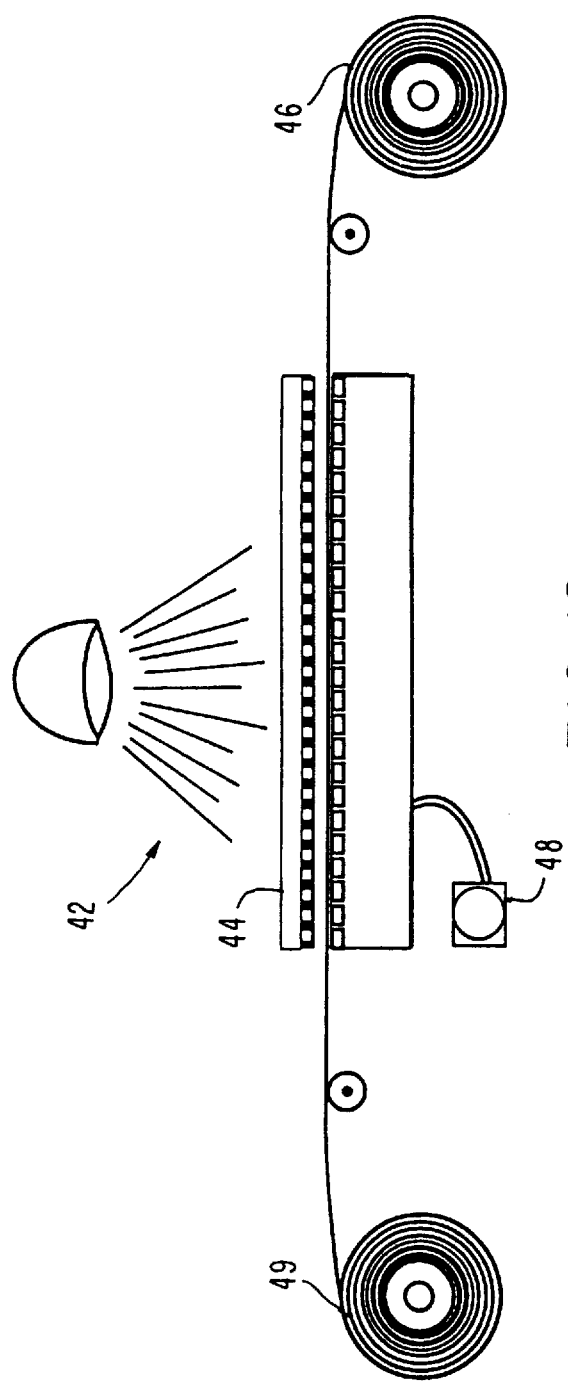

METHOD AND SYSTEM FOR PRODUCING MICROPOLARIZATION PANELS FOR USE IN MICROPOLARIZING SPATIALLY MULTIPLEXED IMAGES OF 3-D OBJECTS DURING STEREOSCOPIC DISPLAY PROCESSES

RELATED CASES

This is a Continuation Application of copending application Ser. No. 08/269,202 filed Jun. 30, 1994, which is a Continuation of application Ser. No. 07/536,419, filed Jun. 11, 1990, entitled "METHODS FOR MANUFACTURING POLARIZERS", now U.S. Pat. No. 5,327,285, issued on Jul. 5, 1994.

BACKGROUND OF THE INVENTION

1. Field of the Invention

This invention relates to the field of polarizers and the high throughput mass manufacturing of a new class of polarizars called micropolarizers. Micropolarizers have been developed for use in spatial multiplexing and demultiplexing image elements in a 3-D stereo imaging and display system.

2. Description of Related Art

This invention is related to my co-pending application Ser. No. 07/536,190 entitled "A System For Producing 3-D Stereo Images" filed on even date herewith incorporated herein by reference in its entirety which introduces a fundamentally new optical element called a micropolarizer. The function of the micropolarizer is to spatially multiplex and spatially demultiplex image elements in the 3-D stereo imaging and displaying system of the aforementioned co-pending application. As shown in FIG. 1, the micropolarizer ($\mu$Pol) 1, 2 is a regular array of cells 3 each of which comprises a set of microscopic polarizers with polarization states P1 and P2. The array has a period p which is the cell size and is also the pixel size of the imaging or displaying devices.

It is possible to turn unpolarized light into linearly polarized light by one of three well known means: 1) Nicol prisms; 2) Brewster Angle (condition of total internal reflection in dielectric materials); and 3) Polaroid film. These are called linear polarizers. The Polaroids are special plastic films which are inexpensive and come in very large sheets. They are made of polyvinyl alcohol (PVA) sheets stretched between 3 to 5 times their original length and treated with iodine/potassium iodide mixture to produce the dichroic effect. This effect is responsible for heavily attenuating (absorbing) the electric field components along the stretching direction while transmitting the perpendicular electric field components. Therefore, if P1 is along the stretching direction of the PVA sheets, it is not transmitted, where as only P2 is transmitted, producing polarized light. By simply rotating the PVA sheet 90 degrees, P1 state will now be transmitted and P2 will be absorbed.

The aforementioned three known means for producing polarized light have always been used in situations where the polarizer elements have large areas, in excess of 1 cm². However, for 3-D imaging with $\mu$Pols using 35 mm film, to preserve the high resolution, the $\mu$Pol array period p may be as small as 10 micron. Therefore, there is no prior art anticipating the use of or teaching how to mass produce $\mu$Pols having such small dimensions.

SUMMARY OF THE INVENTION

The present invention provides a means for high through put mass manufacturing of micropolarizer arrays. To use the $\mu$Pols in consumer 3-D photography, and printing applications, the economics dictate that the cost of $\mu$Pols be in the range of 1 to 5 cents per square inch. For this reason, the low cost PVA is the basis for the manufacturing process.

The present invention also provides a flexible $\mu$Pols manufacturing process which can be adapted to low and high resolution situations as well as alternative manufacturing methods, each of which may be advantageous in certain applications and adaptable to processing different polarizer materials. The present invention further provides an electronically controllable $\mu$Pol.

BRIEF DESCRIPTION OF THE DRAWINGS

FIGS. 2 and 3 illustrate fabrication processes of linear micropolarizers using, respectively, bleaching and selective application of iodine.

FIG. 5 illustrates a process for fabricating linear micropolarizers by means of etching.

FIG. 6 illustrates a method for patterning micropolarizer by mechanical means.

FIGS. 11 and 12 illustrate photo-lithographic patterning steps.

DETAILED DESCRIPTION

Figures 1A, 1B:
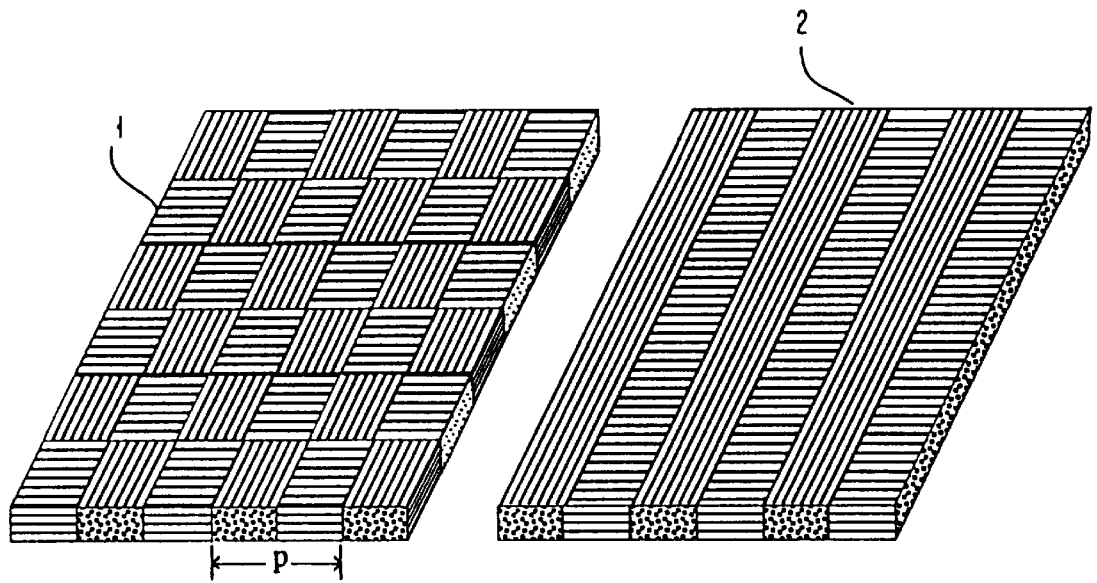
FIG. 1 is an illustration of a micropolarizer array according to the present invention.

Since its invention by E. Land in the 1930's, polyvinyl alcohol (PVA) has been the polarizer material of choice. It is available from several manufacturers including the Polaroid Corporation. It comes as rolls 19 inches wide and thousands of feet long. The PVA, which is 10 to 20 micron thick, is stretched 3 to 5 times original length and treated with iodine to give it its dichroic (polarizing) property. The PVA treated in this manner crystallizes and becomes brittle. The processes below employ certain chemical properties of the PVA. These are: i) resistance to organic solvents and oils; ii) water solubility, 30% water and 70% ethyl alcohol; iii) bleaching of the dichroic effect in hot humid atmosphere and by means of caustic solutions; iv) manifestation of dichroic effect by painting the PVA in iodine/potassium iodide solution; and v) the stabilization of the dichroic effect in boric acid solution. The starting PVA material comes laminated to a clear plastic substrate which protects the brittle PVA and facilitates handling and processing. The substrate is made either of cellulose aceto bytyrate (CAB) or cellulose triacetate (CTA), and is typically 50 to 125 micron thick. CAB and CTA are ultra-clear plastics and at the same time they are good barriers against humidity. For some applications, large glass plates are also used as substrates. Although other polymers, when stretched and treated by dichroic dyes, exhibit similar optical activity to that of PVA and may be fabricated into micropolarizers following the methods taught here, only PVA is considered in the manufacturing processes described in the present invention.

The physical principles on which the polarization of light and other electromagnetic waves, and the optical activity which produces phase retardation (quarter wave and half wave retarders) are described in books on optics, such as: M. Born and E. Wolf, Principles of Optics, Pergamon Press, London, fourth edition, 1970; F. S. Crawford, Jr., Waves, McGraw-Hill, New York, 1968; and M. V. Klein, Optics, Wiley, New York, 1970. There are several important facts used in this invention:

1. Two linear polarizers with their optical axis 90 degrees from each other extinguish light.

2. A linear polarization which is 45 degrees from the optical axis of a quarter wave retarder is converted into a circular polarization.

3. A linear polarization which is 45 degrees from the optical axis of a half wave retarder is converted into a linear polarization rotated 90 degrees.

4. Two linear polarization states, P1 and P2, 90 degrees from each other, are converted into clockwise and counter-clockwise circular polarization states by means of a quarter waver retarder.

5. A circular polarization is converted into a linear polarization by means of a linear polarizer.

6. A clockwise circular polarization is converted into a counter-clockwise polarization by means of a half-wave retarder.

Figure 1C:
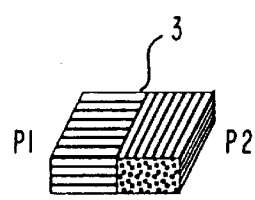
Figures 4A, 4B:
FIG. 4 shows final alignment and lamination processes for making linear micropolarizers.
Figure 4C:
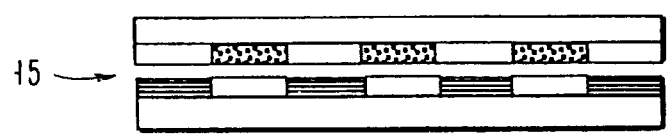
Figure 4D:
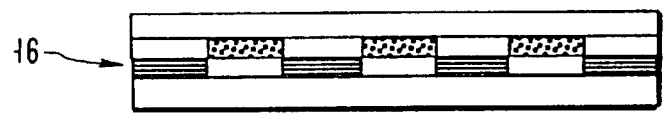
Figure 4E:
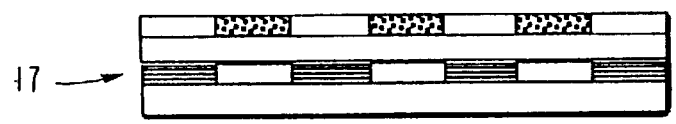
Figure 4F:
Figure 4G:
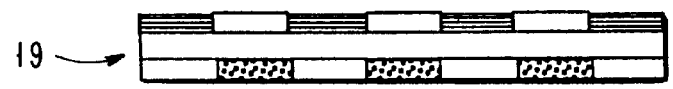
Figure 7A:
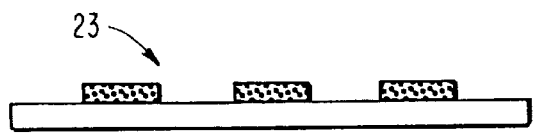
FIG. 7 shows final alignment and lamination processes for making linear micropolarizers by the etching method.
Figure 7B:
Figure 7C:
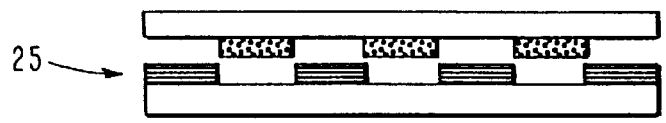
Figure 7D:
Figure 7E:
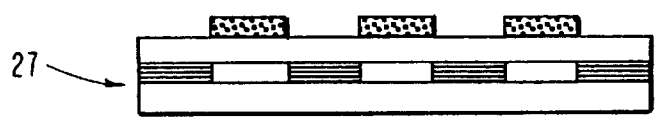
Figure 7F:
Figure 7G:
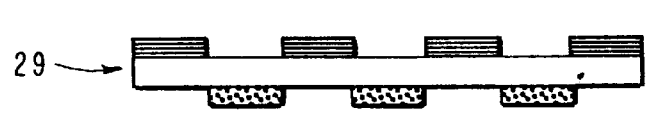
Figures 8A, 8B:
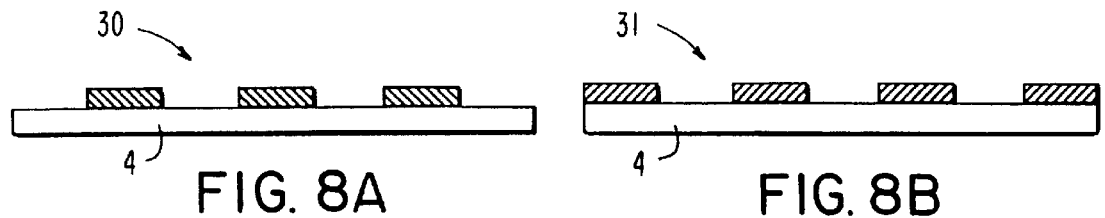
FIG. 8 shows final alignment and lamination processes for making circular micropolarizers by the etching method.
Figure 8C:
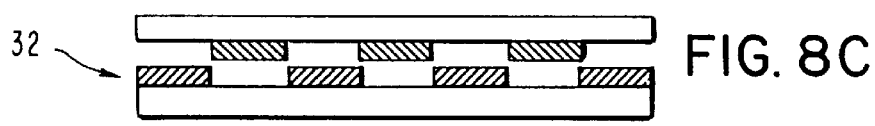
Figure 8D:
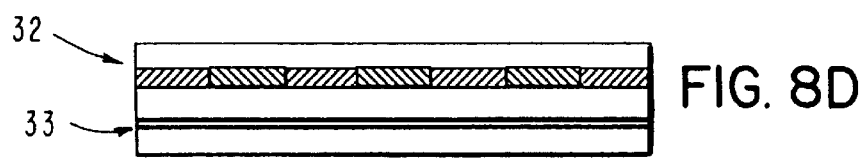
Figure 8E:
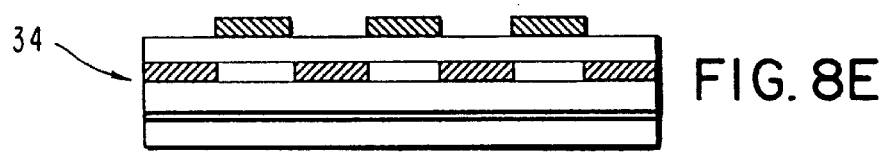
Figure 8F:
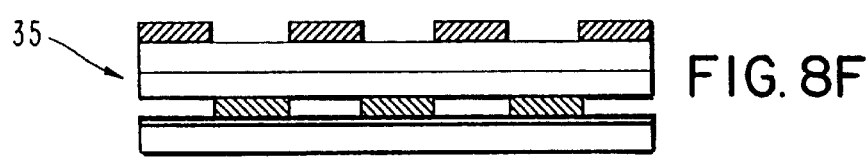
Figure 8G:
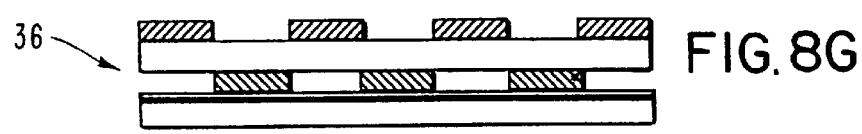

The process for producing the micropolarizers, $\mu$Pols, 1, 2 in FIG. 1 is described in FIG. 2 which starts with a sheet of linear polarizer 5 laminated onto a clear substrate 4. The laminate is coated with photosensitive material 6 called photoresist. This can be one of several well known liquid photoresists marketed by Eastman Kodak and Shipley, or in the form of a dry photoresist sheet called Riston from the Du Pont Company. The latter is preferred because complete laminated rolls of the three materials 3, 5, 6 can be produced and used to start the $\mu$Pols process. The photoresist is subsequently exposed and developed using a mask having the desired pattern of the $\mu$Pols cell 3 producing a pattern with polarization parts protected with the photoresist 6 and unprotected parts 7 exposed for further treatment. These exposed parts 7 are treated for several seconds with a caustic solution, e.g., a solution of potassium hydroxide. This bleaching solution removes the dichroic effect from the PVA so that the exposed parts 8 are no longer able to polarize light. The photoresist is removed by known strippers, which have no bleaching effect, thus the first part 9 of the $\mu$Pols fabrication is produced.

Alternatively, FIG. 3 shows a method for making linear $\mu$Pols by starting with a laminate of PVA 10 which is stretched but does not yet have the dichroic effect, i.e., it has not yet been treated with iodine, and the substrate 4. Following identical steps as above, windows 7 are opened in the photoresist revealing part of the PVA. The next step is to treat the exposed parts with a solution of iodine/potassium iodide and subsequently with a boric acid stabilizing solution. The exposed parts 11 of the PVA become polarizers while those protected with the photoresist remain unpolarizers. Stripping the photoresist completes the first part of the process.

As illustrated in FIG. 4, a complete $\mu$Pol is made using two parts 13, 14 produced by either the process of FIG. 2 or FIG. 3 except that part 13 has polarization axis oriented 90 degrees from that of part 14. The two parts are aligned 15 so that the patterned polarizer areas do not over lap, and then laminated together to from the final product 16. The $\mu$Pol 16 is laminated with the PVA surfaces facing and in contact with each other. The $\mu$Pol 17 is laminated with the PVA of part 13 is in contact with the substrate of part 14. The $\mu$Pol 18 is laminated with the substrates of both parts are in contact with each other. Finally, it is possible to produce the $\mu$Pol 19 with only one substrate onto which two PVA films are laminated and patterned according to the process described above.

The above process leaves the patterned PVA film in place and achieves the desired result by either bleaching it or treating it with iodine solution. The processes described in FIGS. 5 and 6 achieve the desired result by the complete removal of parts of the PVA. In FIG. 5, the starting material is any PVA film 20 (linear polarizer, quarter wave retarder, or half wave retarder) or any non-PVA optically active material laminated to a substrate. As described above, windows 7 in the photoresist are opened. The exposed PVA 7 is removed 21 by means of chemical etching (30% water/70% ethyl alcohol solution), photochemical etching, eximer laser etching or reactive ion etching. Stripping the photoresist, the first part 22 of the $\mu$Pols process is completed.

The removal of PVA can also be accomplished by mechanical cutting or milling means. FIG. 6 illustrates the process which uses a diamond cutter 66 mounted on a motor driven shaft 74. In one embodiment, the PVA 68 is sandwiched between two polymers, such as poly-methyl methacrylate, PMMA, film 67, and the sandwich is laminated onto a substrate 69. The diamond saw is used to cut channels. The channel width and the distance between the channels are identical. The PMMA serves to protect the top PVA surface from abrasion and protects the substrate from being cut by the saw. Next the PMMA on top of the PVA and in the channel is dissolved away, leaving the part 71 with clean substrate surface 70. This part can be used as is to complete the $\mu$Pol fabrication or the original substrate 69 is removed by dissolving away the rest of the PMMA, after having attached a second substrate 72. This part which consists of the patterned PVA 68 laminated to the substrate 72 is used in a subsequent step to complete the $\mu$Pol.

Even though this process is mechanical in nature, it has been shown in Electronic Business, May 14, 1990, page 125, that channels and spacings as small as 5 micron can be made using diamond discs manufactured by Disco HI-TEC America Inc., of Santa Clara, Calif. Realizing that using only one disc makes the process slow and costly, the arrangement in FIG. 6 is used where many discs 73 in parallel 75 is preferred. Each disc has its center punched out in the shape of a hexagonal so that it can be mounted on a shaft 74 with a hexagonal cross section. Hundreds of such discs are mounted on the same shaft and are spaced apart by means of spacers 76 whose diameters are smaller than those of the discs. The diameter difference is used to control the cutting depth. The spacers also have hexagonal centers. The cutting discs and the spacers have the same thickness in order to obtain identical channel width and channel spacing. The discs and spacers are mounted on the shaft tightly to prevent lateral motion, while the hexagonal shaft prevents slipping. The discs are made to rotate between 20,000 and 50,000 RPM and the laminate is cut in continuous fashion, thus achieving high through put.

To complete making a whole $\mu$Pol the parts 22, 71, 72 prepared by the PVA removal methods are used as in FIG.

7. If the PVA is a linear polarizer, then, parts 23, 24 have patterned polarizers which are oriented 90 degrees from each other, and when aligned 25, and laminated together, complete linear μPols 26, 27, 28, 29 result. If the PVA is quarter wave retarder, then the parts 30, 31 of FIG. 8 have patterned retarders with optical axes oriented 90 degrees from each other, and when aligned 32 and laminated to a sheet of linear polarizer 33, complete circular μPols 34, 35, 36 result.

Figure 9A:
FIGS. 9 and 10 illustrate processes for making linear and circular polarizers eliminating an alignment step.
Figure 9B:
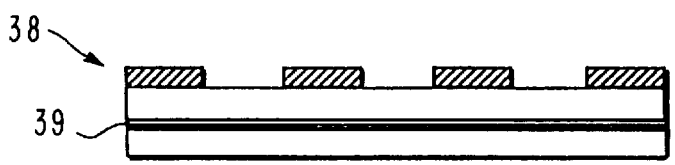
Figure 9C:
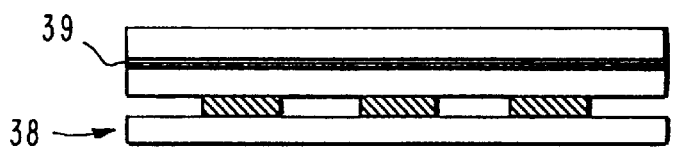
Figure 10A:
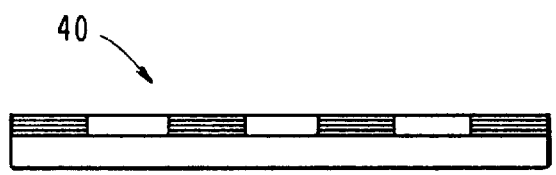
Figure 10B:
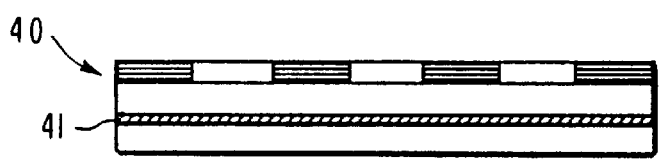
Figure 10C:
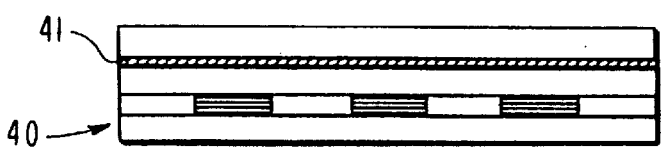

Up until now all μPols have been made using two patterned parts aligned to each other and then laminated as in FIGS. 4, 7, and 8. It possible make μPols with a single patterned part 38 or 40 in FIGS. 9 and 10, and without the alignment step. In FIG. 9, the single patterned part 38 consists of a patterned half-wave retarder on a substrate 4. It is mounted simply on a sheet of polarizer 39 with no alignment necessary and a complete μPols results. If a linear polarizer sheet 39 is used, the result is a linear μPols. If a circular polarizer sheet 39 is used, the result is a circular μPols. In FIG. 10 the single patterned part 40 has a linear polarizer which is simply mounted on a circular polarizer sheet 41 to produce a complete μPols.

FIG. 11 shows the apparatus 42 used for contact printing of the laminate 46 made of photoresist, PVA, and its substrate. The apparatus consists of a vacuum box 47, and a vacuum pump 48 attached thereto. The top of box is flat surface with vacuum holes which hold the laminate flat during exposure. The mask 45 with its emulsion facing down, makes direct contact with the photoresist surface with the aid of the top glass cover 44. The very high intensity UV lamp 43 is then turned on for 30 to 60 seconds to expose the photoresist. The laminate is subsequently removed for development and the rest of the μPols fabrications processes as described in FIGS. 2, 3, and 5. This printing process using apparatus 46 is automated for large area μPols production as shown in FIG. 12. The laminate 46 is furnished in a large roll, is fed to apparatus 42 when the vacuum pump 48 is off and the mask and cover 44 are open. By means of an electronic controller, the following automatic sequences are carried out: (1) the vacuum is turned on; (2) the cover and mask are lowered; (3) the lamp is turned on for certain period of time; (4) the lamp is turned off; (5) the mask and cover are lifted; (6) the vacuum is turned off; and (7) the laminate is advanced. These steps are repeated until the whole roll is finished. The exposed roll 49 is then processed further. This exposure apparatus is simple and has no critical alignment requirements.

Figure 13:
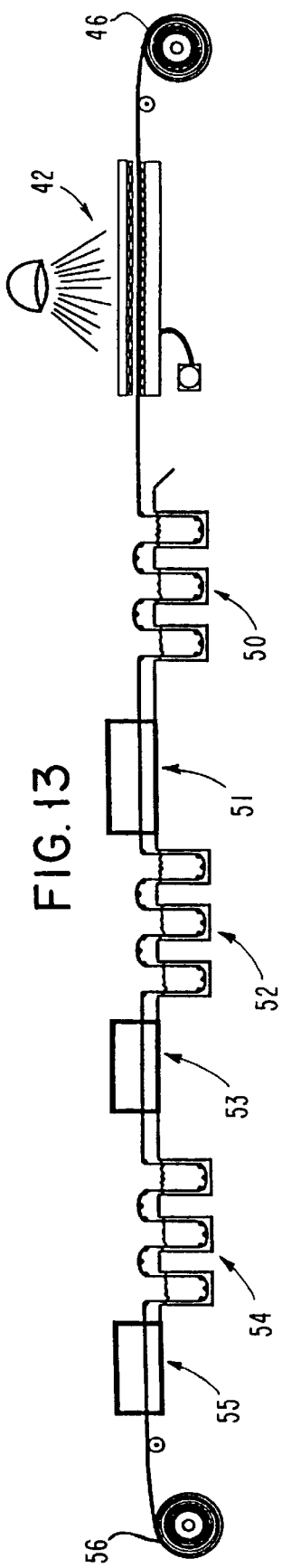
FIG. 13 illustrates an automated high through-put process for continuous production of micropolarizer sheets by photo-lithographic means.

The fully automated embodiment in FIG. 13 is used for continuous mass production. The raw roll of laminate 46 enters from the right and the finished roll 56 of μPols exists from the left. As one laminate segment is exposed, it is advanced to the left, developed and rinsed in station 50. Said segment is then further advanced to the left to be dried in station 51, and advanced further to section 52. This station carries out the most critical μPols process by one of three methods discussed above in connection with FIGS. 2, 3, and 5. These are:

1. Bleaching by means of potassium hydroxide then rinsing.

2. Polarizing by means of iodine/potassium iodide solution, boric acid stabilizing solution, then water/methyl alcohol rinse.

3. Dry or wet etching of the PVA.

After the rinsing step in station 52, the segment is advanced to station 53 for drying and heat treatment. The photoresist stripping and rinsing is done in 54 and the final drying step in 55. The finished roll 56 is laminated with a polarizer sheet according to FIGS. 9 and 10 complete the μPols.

Figure 14:
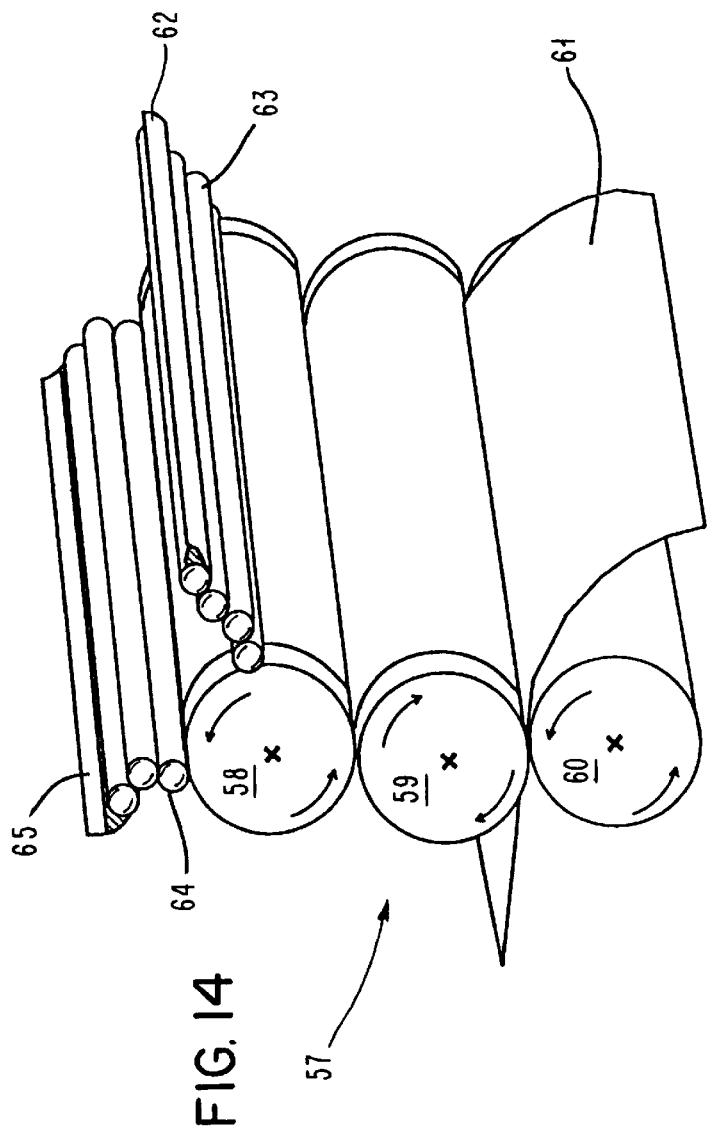
FIG. 14 illustrates an automated high throughput process for continuous production of micropolarizer sheets by direct application of bleaching ink or iodine-based ink.

The photolithographic printing used above involves several steps:
1. Application of the photoresist
2. Baking
3. Making contact with the mask
4. Exposure
5. Development
6. Rinsing
7. Drying
8. Post baking
9. Stripping
10. Rinsing
11. Drying These steps have been eliminated by using the mechanical method described in FIG. 6. They are also completely eliminated by using the embodiment illustrated in FIG. 14. This apparatus 57 promises to be the least expensive high volume manufacturing process for μPols. It consists of a plate drum 58 to which a plate a fixed, a blanket drum 59 which has a rubber surface, and an impression drum 60. The inks from ink fountains 62, 65, are transferred to the plate by means of rollers 63, 64. The pattern is transferred from the plate to the blanket drum which in turn it transfers to the PVA laminate 61. The rotation of the blanket drum and the impression drums draws in the laminate, and blanket rubber surface pressing on the laminate causes proper printing. Although the hardware is similar to that used in offset printing press, the process is different from offset printing. The principal difference is in the ink formulation. In offset printing slightly acidic water is used in fountain 65, and an oil-based paint (linseed oil, pigments, binder, and other additives) is used in fountain 62. These are not intended to interact with the paper. The pigments in the oil based solution will remain bonded to the paper, and the water evaporates. In the μPols printing process, on the other hand, the oil based solution is clear and is not intended to remain, while the water based solution is intended to interact with the PVA and permanently modify it, by bleaching it or by endowing it with the dichroic property. Another difference is the use of the negative image on the plate to print a positive image of the pattern on the PVA laminate, whereas in the offset printing, the opposite occurs. The plates are made by means which are well known in the offset printing industry.

The μPols process using apparatus 57 has three embodiments which depend on the content of the water based solutions in fountain 65, while fountain 62 contains a fast drying clear oil solution:

1. Selective Bleaching: The water based solution contains a bleaching agent such as potassium hydroxide or sodium hydroxide which applied selectively as pattern on the polarized PVA. Where applied, the solution removes the iodine and its polarizing effect. Rinsing and drying steps follow this bleaching step.

2. Selective Dichroism: The water based solution contains a iodine/potassium iodide which is applied selectively as a pattern on the unpolarized PVzA. Where applied, the solution turns the PVA into a polarizer. This step is followed by a stabilizing step using a boric acid solution and subsequently rinsing using a methyl alcohol solution and drying steps.

3. Selective Etching: The water based solution contains a clear polymer which is applied selectively as a pattern on the polarized or unpolarized PVA. Where applied, the solution leaves a protective polymer layer. This step is followed by an etching step to remove the unprotected PVA, by rinsing and drying steps.

Electrically Controllable Micropolarizers

Figure 15:
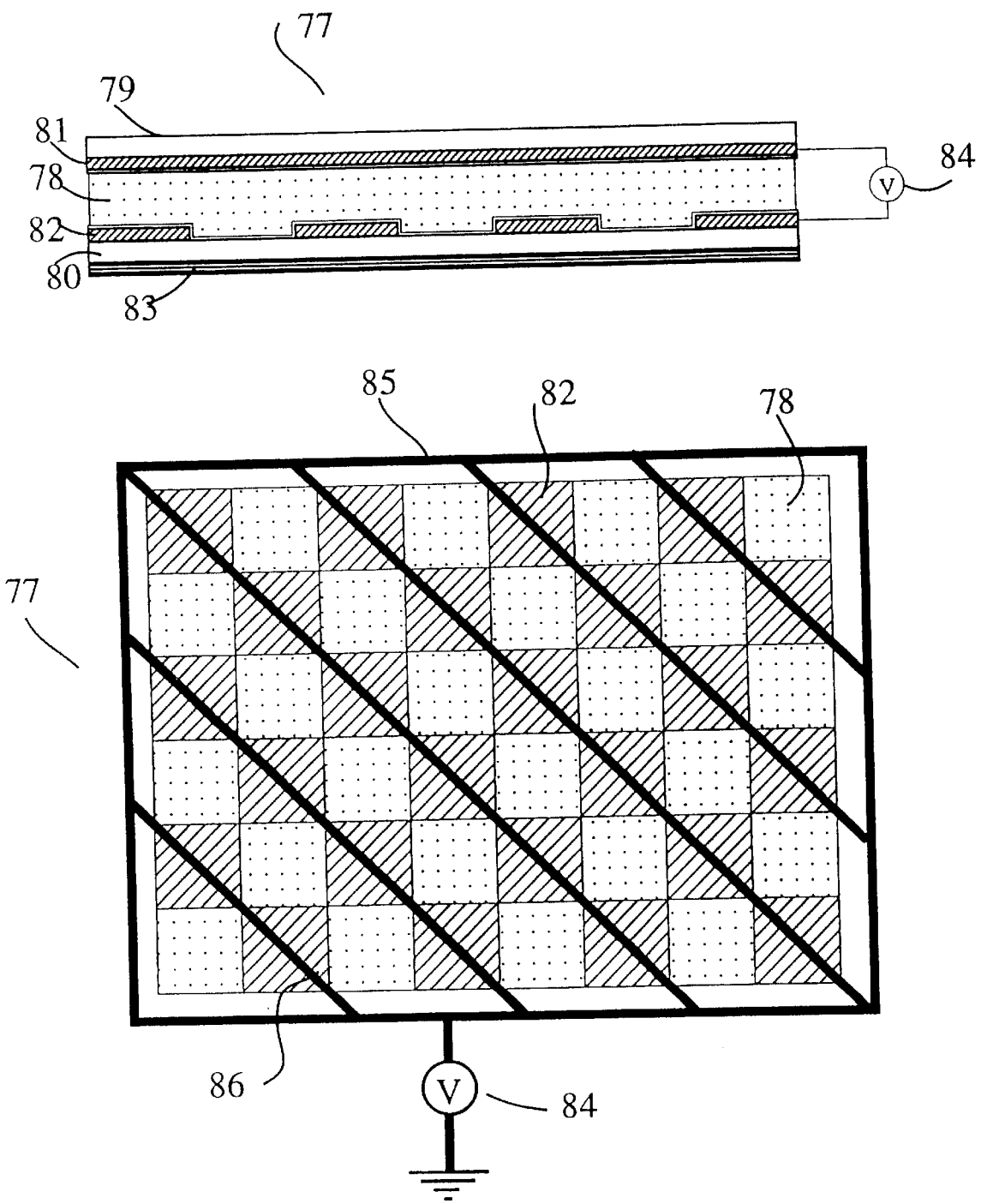
FIG. 15 illustrates an active electronically controllable micropolarizer based on electro-optical effect of liquid crystals.

There are applications in which a variable µPols are needed, and in particular, µPols which are electronically alterable. This can be accomplished by using electro-optical materials such as liquid crystals or organic nonlinear optical polymers, see C. C. Teng and H. T. Man, Applied Physics Letters, 30, 1734 (1990), or magneto-optical materials which have large Faraday rotation. All these materials rotate the polarization of incident radiations by applying voltages or magnetic fields. The preferred embodiment 77 in FIG. 15 uses a twisted nematic liquid crystal 78 which rotates the polarization 90 degrees by applying a voltage alternating at 10 to 20 KHz and having an RMS value of about 10 volts. This voltage is applied between the checker-board patterned transparent electrode made of indium-tin oxide ITO 82 on a glass substrate 80 and an unpatterned ground ITO layer 81 deposited on a second glass substrate 79. The patterned ITO 82 are connected to a common voltage bus 85. Each connection 86 is made of aluminum film whose area is a small percentage of the ITO area, in the order of 10%. Thus we created two types of cells: One type which has liquid crystal and ITO 81, 82 on both sides, will be affected by the applied electric field; and the other type which has liquid crystal but has ITO 81 on one side only and hence will not be affected by the applied electric field. The polarizer sheet 83 with polarization state P1 is laminated to the glass substrate 80 completes the electronic µPols.

The operating principles of electronically switchable µPols is as follows: When the voltage 84 is zero, the polarization P1 of the incident light will not change. When a voltage is applied, the cells with ITO on both sides will rotate the polarization to a state P2, while the cells with ITO on one side only leave the polarization P1 unchanged. The end result is a regular periodic array of cells with two polarization states P1 and P2. This is a µPol that can be turned off and on.

What is claimed is:

1. A method for fabricating a micropolarization panel for use in stereoscopic viewing of a 3-D object recorded in a spatially multiplexed image thereof, said method comprising the steps of:
   (a) providing a first film coated with photoresist;
   (b) exposing the first film to a source of electromagnetic radiation through a first mask having a first predetermined pattern to remove the photoresist from preselected parts of the first film;
   (c) treating the first film to affect the preselected parts of the first film to provide a pattern of polarized and unpolarized parts in the first film, the polarized parts of the first film having a first polarization state P1;
   (d) repeating steps (a), (b) and (c) with a second film coated with photoresist to provide a pattern of polarized and unpolarized parts in the second film, the polarized parts of the second film having a second polarization state, P2 and, during the exposing step, using a second mask having a second predetermined pattern that is the logical inverse of the first predetermined pattern;
   (e) aligning the treated first and second films so that the polarized parts of said first film are aligned with and overlap the unpolarized parts of said second film and vice versa; and
   (f) laminating the aligned first and second films to one another.

2. The method of claim 1, wherein said first film comprises a polarized film having the first polarization state, P1, and said second film comprises a polarized film having the second polarization state, P2; and
   wherein step (c) is carried out by treating said first and second films to remove the polarization state of the respective preselected exposed parts of each of said first and second films.

3. The method of claim 2, wherein said first and second films each comprise a polarized PVA film.

4. The method of claim 3, wherein the step (c) comprises applying a caustic solution to the respective preselected exposed parts of each of said first and second films.

5. The method of claim 1, wherein said steps (a) and (d) each comprise mounting each of said first and second films on a respective substrate layer.

6. The method of claim 1, wherein steps (e) and (f) comprise mounting each of said first and second films to a common substrate layer interposed between said first and second films.

7. The method of claim 1, wherein the first and second polarization states are linear polarization states oriented 90° from one another.

8. The method of claim 1, wherein said first film comprises a polarized film having said first polarization state, P1, and said second film comprises a polarized film having said second polarization state, P2;
   wherein said steps (a) and (d) each include mounting each of said first and second films on a respective substrate layer; and
   wherein step (c) comprises etching away the respective preselected parts of each of said first and second films to provide a pattern of polarized parts mounted on each respective substrate layer.

9. The method of claim 1, wherein said first and second films are mounted on a common substrate layer.

10. A method for fabricating a micropolarization panel for use in stereoscopic viewing of a 3-D object recorded in a spatially multiplexed image thereof, comprising the steps of:
    (a) providing a film coated with photoresist;
    (b) exposing said film to a source of electromagnetic radiation through a mask having a predetermined pattern to remove the photoresist from preselected parts of said film; and
    (c) thereafter treating said film to affect the preselected parts of said film to provide a pattern of polarized and unpolarized parts of said film, wherein the polarized parts of said film having a polarization state, P1.

11. The method of claim 10, wherein said film comprises a polarized film having said polarization state P1; and wherein the treating step is carried out by treating said polarized film to remove the polarization state of the preselected exposed parts thereof.

12. The method of claim 11, wherein said film comprises a polarized PVA film.

13. The method of claim 14, wherein step (c) comprises applying a caustic solution to said preselected exposed parts.

14. The method of claim 10, which further comprises laminating said film to a sheet of polarizer material.

15. The method of claim 11, wherein said first polarization state, P1, is a linear polarization state, and wherein the sheet of polarizer comprises a sheet of circular polarizer material.

16. The method of claim 11, wherein said film comprises a polarized film having said first polarization state, P1;
    wherein step (a) comprises mounting said film on a substrate layer; and wherein step (c) comprises etching away the preselected parts of said film to provide a pattern of polarized parts mounted on the substrate layer.

17. A system for fabricating a micropolarization panel for use in stereoscopic viewing of a 3-D object recorded in a spatially multiplexed image thereof, said system comprising the steps of:

film providing means for providing film material characterized by an ability to either phase shift or polarize light passing therethrough;

film coating means for coating said film material with a protective mask having a predetermined pattern that exposes preselected parts of the film;

film treating means for treating said film material with said protective mask so as to permanently form first and second optically transparent patterns therein, wherein said first optically transparent pattern imparts a first polarization state, P1, to light emanating from pixels through said first optically transparent pattern, and said second optically transparent pattern imparts a second polarization state, P2, to light emanating from pixels through said second optically transparent pattern, and wherein said first optically transparent pattern is the logical inverse of said second optically transparent pattern; and film cutting means for cutting said treated film material so as to form said micropolarization panel.

18. The system of claim 17, wherein said first and second polarization states are linear polarization states oriented 90° from one another.

19. The system of claim 17, wherein said film treating means comprises means for applying a caustic agent to said film coated with said protective mask.

20. The system of claim 17, which further comprises means for applying a lamination layer upon said treated film.

21. The system of claim 17, wherein said film providing means comprises first and second rotatable drums for supporting and transporting said film.

22. A method for fabricating a micropolarization panel for use in stereoscopic viewing of a 3-D object recorded in a spatially multiplexed image thereof, said method comprising the steps of:

(a) providing a sheet of wave retarder film;

(b) applying a protective coating to said wave retarder film; and (c) chemically treating said wave retarder film to selectively remove portions thereof to realize first and second optically transparent patterns in said sheet of wave retarder film and thereby provide said micropolarization panel, wherein said first optically transparent pattern imparts a first polarization state P1 to light emanating through said first optically transparent pattern, said second optically transparent pattern imparts a second polarization state P2 to light emanating through said second optically transparent pattern, and said second optically transparent pattern is the logical compliment pattern of said first optically transparent pattern.

23. The method of claim 22, wherein said sheet of wave retarder film is a sheet of half wave retarder material.

24. Apparatus for treating a film, which comprises:

a first roll for periodically feeding film as a continuous sheet;

a vacuum box arranged downstream from said first roll, for periodically receiving in a series from said first roll, contiguous longitudinally extending portions of the continuous sheet;

said vacuum box including a flat sheet receiving surface having a plurality of vacuum holes, and said sheet receiving surface being arranged to periodically receive, in series, the portions of said continuous sheet;

a vacuum pump coupled to said vacuum box to periodically provide a pressure differential across said vacuum holes to hold each of the portions of said continuous sheet against said sheet receiving surface;

a mask having a predetermined pattern aligned with said sheet receiving surface;

a source of electromagnetic radiation aligned with the mask to periodically radiate electromagnetic waves through said mask and onto each portion of said continuous sheet to expose preselected parts of the portion of said continuous sheet to electromagnetic radiation, the exposed preselected parts being spaced as a regular pattern across the portion of said film; and a second roll arranged downstream from said vacuum box for receiving and taking up said continuous sheet from said vacuum box.

25. The apparatus of claim 24, further comprising film treating means arranged downstream from said vacuum box, for receiving said continuous sheet and applying a treatment solution to said continuous sheet.

26. The apparatus of claim 25, wherein said sheet of film comprises a polarizable film, and wherein said treatment solution comprises a solution for removing the polarization state from parts of said film exposed to the electromagnetic radiation through said mask.

27. The apparatus of claim 25, wherein said sheet of film comprises a polarizable film and wherein said treatment solution comprises a solution applied to the parts of said film exposed to said electromagnetic radiation to cause such parts thereof to acquire a polarization state P1.

28. Apparatus for producing a continuous sheet of micropolarizing material for use in stereoscopic viewing of a 3-D object recorded in a spatially multiplexed image thereof, said apparatus comprising:

a rotatable plate drum including a plate having a predetermined pattern;

treatment solution application means, operably associated with said plate drum, for applying a treatment solution to said plate drum so that said treatment solution is applied to the surface of said plate according to said predetermined pattern as said rotatable plate drum rotates;

a rotatable transfer drum arranged in a contacting relationship with said plate drum, for receiving said treatment solution from said plate drum upon simultaneous rotation of said rotatable plate drum and said rotatable transfer drum, and transferring said treatment solution to said rotatable transfer drum according to said predetermined pattern;

a rotatable impression drum arranged in a contacting relation to said rotatable transfer drum for feeding a sheet of transparent film between said transfer and impression drums during rotation of said drums and transferring said treatment solution from said rotatable transfer drum to said sheet of film according to said predetermined pattern so that said treatment solution affects the phase shaft or polarization characteristics of preselected parts of said optically transparent film according to said predetermined pattern, and produces a continuous sheet micropolarizing material for use in stereoscopic viewing of a 3-D object recorded in a spatially multiplexed image thereof.

29. The apparatus of claim 28, wherein said sheet of optically transparent film comprises a sheet of polarized film and wherein said treatment solution comprises a solution which affects the polarization characteristics of parts of said film exposed to said treatment solution.

30. The apparatus of claim 28, wherein said sheet of film comprises a polarizable film and wherein said treatment solution comprises a solution when applied to the parts of said film exposed to said solution, causes such parts to acquire a polarization state P1.

31. A system for fabricating a patterned polarizer film for use in stereoscopic viewing of a 3-D object recorded in a spatially multiplexed image thereof, comprising the steps of:

film providing means for providing a film;

film coating means for coating said film with a protective mask having a predetermined pattern that exposes preselected portions of said film; and film treating means for thereafter treating said film to affect the preselected parts of said film to provide a pattern of polarized and unpolarized portions of said film, wherein said polarized parts of said film have a first polarization state, P1.

32. The system of claim 31, wherein said film comprises a polarized film having said polarization state, P1; and wherein said film treating means comprises polarization state removing means for removing the polarization state of the preselected exposed portions of said film.

33. The system of claim 32, wherein said film comprises a polarized PVA film material.

34. The system of claim 32, wherein said film comprises a cholesteric liquid crystal polarizer material.

35. The system of claim 32, wherein said film comprises a half-wave retarder material.

36. The system of claim 32, wherein said film comprises a quarter-wave retarder material.

37. The system of claim 32, wherein said polarization state removing means comprises means for applying an enchant or a solvent solution to the preselected exposed portions of said film.

38. The system of claim 31, which further comprises film laminating means for laminating said film to a sheet of polarizer material.

39. The system of claim 38, wherein said film is a retarder material; and wherein said sheet of polarizer comprises a sheet of linear polarizer material.

40. The system of claim 31, wherein said film comprises a polarized film having said polarization state P1; and wherein said polarization state removing means comprises means for etching away preselected portions of said film to provide a pattern of polarized portions of said film.

41. A method for fabricating a micropolarization panel for use in stereoscopic viewing of a 3-D object recorded in a spatially multiplexed image thereof, said method comprising the steps of:

(a) providing a first film coated with a first protective mask having a predetermined pattern that exposes preselected parts of said first film;

(b) treating said first film to affect the preselected parts of said first film to provide a pattern of polarized and unpolarized parts of said first film, the polarized parts of said first film having a first polarization state, P1;

(c) repeating steps (a) and (b) with a second film coated with a second protective mask to provide a pattern of polarized and unpolarized parts of said second film, said polarized parts of said second film having a second polarization state, P2, and said second protective mask having a second predetermined pattern that is the logical inverse of said first predetermined pattern;

(d) aligning the treated first and second films so that the polarized parts of said first film are aligned with and overlap the unpolarized parts of said second film and vice versa; and (e) laminating the aligned first and second films to one another.

42. The method of claim 41, wherein said first film comprises a polarized film having said first polarization state P1, and said second film comprises a polarized film having said second polarized state P2; and wherein step (b) comprises treating said first and second films to remove the polarization state of the respective preselected exposed parts of each of said first and second films.

43. A method for fabricating a micropolarizing material for use in stereoscopic viewing of a 3-D object recorded in a spatially multiplexed image thereof, said method comprising the steps of:

(a) providing a film coated with a protective mask having a predetermined pattern that exposes preselected parts of said film, said predetermined pattern having a spatial period on the order of microscopic dimensions; and (b) treating said film to affect the preselected parts of said film to provide micropolarizing film having a pattern of polarized and unpolarized parts of said film, corresponding to said predetermined pattern of said protective mask, and said polarized parts of said film having a polarization state P1.

44. A system for fabricating a micropolarization panel for use in stereoscopic viewing of a 3-D object recorded in a spatially multiplexed image thereof, said system comprising:

film providing means for providing a sheet of wave retarder film;

coating application means for applying a protective coating to said wave retarder film; and film treating means for chemically treating said wave retarder film to selectively remove portions thereof to provide first and second optically transparent patterns in said sheet of wave retarder film and thereby providing said micropolarization panel, whereby said first optically transparent pattern imparts a first polarization state P1 to light emanating through said first optically transparent pattern, said second optically transparent pattern imparts a second polarization state P2 to light emanating through said second optically transparent pattern, and said second optically transparent pattern is the logical compliment pattern of said first optically transparent pattern.

* * * * *